H. L. HUMMEL.
CLAMP.
APPLICATION FILED APR. 17, 1916.
1,205,635.
Patented Nov. 21, 1916.
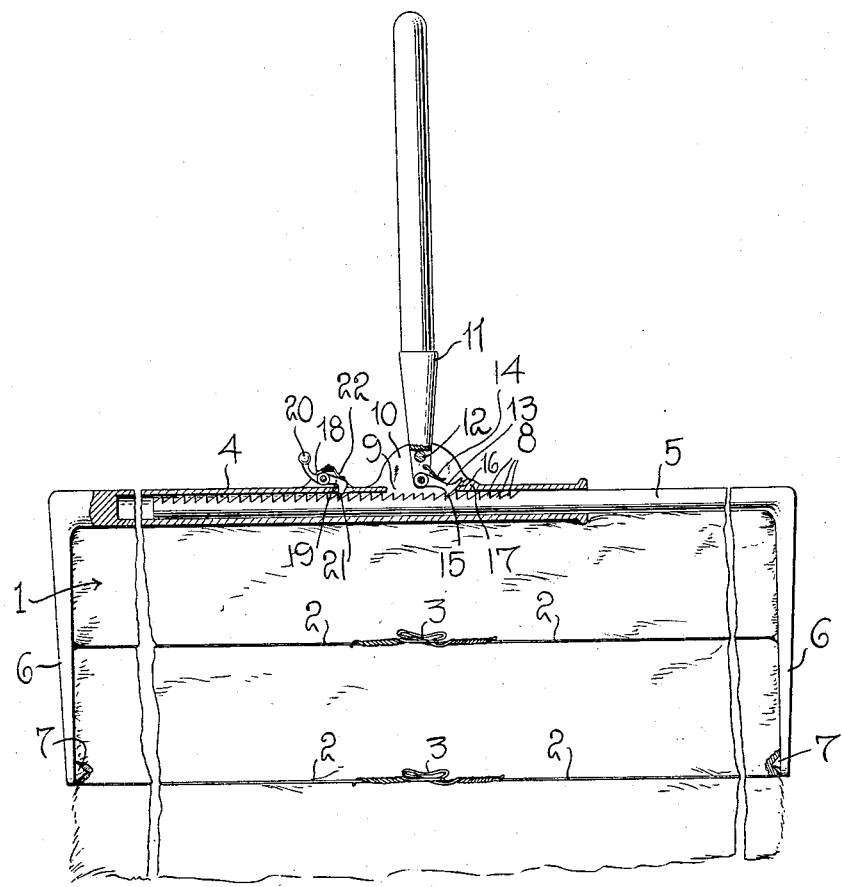
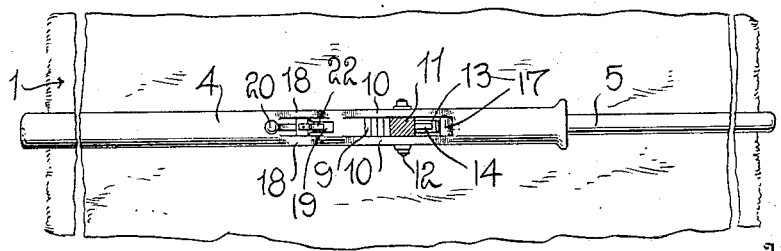
Inventor
H. L. HUMMEL
By Watson E. Coleman
Attorney

UNITED STATES PATENT OFFICE.

HERMAN L. HUMMEL, OF TELLURIDE, COLORADO.

CLAMP.

1,205,635.  Specification of Letters Patent.  Patented Nov. 21, 1916.

Application filed April 17, 1916. Serial No. 91,699.

*To all whom it may concern:*

Be it known that I, HERMAN L. HUMMEL, a citizen of the United States, residing at Telluride, in the county of San Miguel and State of Colorado, have invented certain new and useful Improvements in Clamps, of which the following is a specification, reference being had to the accompanying drawings.

This invention relates to an improved implement to facilitate the removal of the ordinary binding wires from bales of hay or the like when it is desired to loosen the bale for any purpose whatever.

During the process of baling hay, the binding wires are secured about the bales when the same are in a compressed state and consequently after the wires have been secured about the bale and pressure removed therefrom, the wires are drawn exceedingly taut. As a result when it is desired to remove the wires it is practically impossible to disengage one end from the other, it being necessary to either cut or break the same by a suitable tool such as a pair of pliers or wire cutters. This practice has many disadvantages, the principal among which are that short ends of the broken wires are often permitted to remain in the hay and the wires are destroyed, at least in so far that the same are no longer serviceable for the purpose of binding other bales.

The principal aim of the invention is to provide an implement which will permit of the ready removal of the wire from the bales without in any way mutilating or destroying the same and which will obviate all possibility of any of the ends of the wires remaining in the hay, such ends having heretofore in many instances caused the death of animals swallowing them.

The features of novelty of construction and arrangement of parts of the improved implement whereby the results mentioned are accomplished will be hereinafter more fully described in connection with the accompanying drawings and then specifically pointed out in the appended claims.

In the drawings, Figure 1 is a view partly in elevation and partly in section of an implement embodying the improvements of my invention; and Fig. 2 is a top plan view of the device with the handle or lever in section.

Referring to the drawings by numerals wherein is illustrated the preferred embodiment of my invention, 1 designates a bale of hay which is held in a compressed condition for transportation or other purposes in the ordinary manner by means of the binding wires 2 which extend around the bale and are secured together at their free ends as indicated at 3. The manner of securing the free ends of these binding wires is of no consequence but for purposes of illustration I have shown one wire as being bent and engaged with a bent portion of the other wire, the bent portions of each of the wires being wound or twisted upon themselves in the ordinary manner.

The improved implement comprises a pair of sections 4 and 5, each of which is provided at its outer end with an angularly extended jaw 6 terminating in a spur 7, the jaws 6 being of any suitable length and having the spurs 7 arranged upon their inner faces as is shown. The sections 4 and 5 are formed from any suitable material and the former is preferably of tubular construction throughout a major portion of its length so as to telescopically receive the solid section 5 which is freely slidable therein and which is provided upon its outer edge throughout a major portion of its length with a plurality of teeth 8.

Intermediate its ends the tubular section 4 is provided upon its outer face with an elongated slot 9 to either side of which are arranged the ears 10 which are preferably formed integral with the tubular section and which are adapted to receive therebetween the lower end of a lever 11, a pin 12 being passed through alined openings in the ears and in the lever adjacent its lower end whereby the lever is connected to the tubular section for swinging movement.

The inner end of the lever 11 extends beyond the pivot pin 12 toward the toothed face of the section 5 any suitable distance and has pivotally connected thereto a dog 13 which is normally held in engagement with the teeth of the section 5 by means of a spring 14, the dog being provided at its free end with an offset portion or tooth 15 for engagement with any one of the teeth of the section 5 so that when the lever 11 is swung upon its pivot 12 in one direction, the dog will cause the section 5 to be moved longitudinally of the section 4 as will be understood. The under face of the tooth 15 is beveled as indicated at 16 so that when the lever is swung in an opposite direction this bevel face will engage with a transverse rounded lug 17 upon the section 4 and cause the same to become disengaged or lifted from the teeth of the section 5.

Adjacent the inner end of the slot 9 the section 4 has formed upon its outer face a second pair of ears 18 between which is arranged a dog 19, the same being provided with an offset portion 20 extending outwardly any suitable distance beyond the outer face of the ears and tubular section and having a tooth 21 which is normally held in engagement with any one of the teeth of the section 5 by means of a spring 22. By depressing the portion 20 of this dog, the inner toothed end of the same may be raised from engagement with the section 5 against the action of the spring 22 as will be obvious.

By arranging the implement as just described upon a bale of hay or the like, as illustrated in Fig. 1 of the drawing, and by relatively longitudinally sliding the sections 4 and 5, the jaws 6 may be engaged with the ends of the bale, the spurs 7 biting thereinto to prevent upward movement of either of the sections. After the jaws of the sections 4 and 5 have been engaged with opposite sides or ends of the bale, the lever 11 is grasped and a pull exerted thereon in a direction to cause the dog 13 to engage with one of the teeth of the section 5 and slide this section longitudinally of the tubular section to compress the material of the bale. After the lever has been swung in this direction to its lowermost position, the dog 19 will be forced into engagement with one of the teeth of the section 5 by means of the spring 22 to retain the sections in a clamping position. Thus the tension of the compressed bale upon the binding wires 2 will be released and the twisted ends of the wires may be readily disengaged, one from the other and removed from engagement with the bale. By raising the lever and swinging the same upon its pivot in the opposite direction, the angular face 16 of the dog 13 will be caused to engage with the lug 17 upon which it will ride and thus disengage itself from the teeth of the second section. Then by depressing the portion 20 of the dog 19 to disengage the teeth 21 from the second section, the sections may be moved outwardly relatively and disengaged from the bale.

By the use of an implement as just described, it will be noted that the binding wires may be removed from the bale without in any way destroying or mutilating the same so that the same may be used a second or third time for a similar purpose and by obviating the necessity of cutting the wires, no short ends will be left among the hay to be swallowed by animals feeding upon the same.

From the foregoing description taken in connection with the accompanying drawings, it is thought that the construction, operation and advantages of my improved clamp will be clearly understood and while I have herein shown and described certain specific embodiments of my invention, I do not wish to be limited thereto except for such limitations as the claims may import.

I claim:

1. A device of the character described comprising a pair of telescoping sections, teeth formed upon one of said sections, a lever pivotally connected to the other section, a dog on said lever for engagement with the teeth of the other section, and a second dog carried by the second section and independent of the lever for engagement with the teeth of the first section, said second dog having a portion thereof extending exteriorly and in spaced relation to the second section for the purpose set forth.

2. A device of the character described comprising a pair of relatively longitudinally movable sections, each of said sections being provided with jaws, a lever pivotally connected to one of said sections, teeth formed on the other section, a dog pivoted to said lever and adapted to engage the teeth of the second section to move the same longitudinally of the first section upon the swinging of the lever, a second dog to prevent outward movement of the second section relative to the first section, and means to cause the first dog to automatically disengage itself from the teeth of the second section upon swinging the lever in an opposite direction.

3. A device of the character described comprising a pair of telescoping sections, each of said sections being provided with a jaw, one of said sections having a lever pivoted thereto, the other of said sections being provided with teeth, a dog pivoted to the lever for engagement with the teeth, a lug on one of said sections, said dog being provided with an annular face for engagement with said lug when the lever is moved in one direction for the purpose set forth.

In testimony whereof I hereunto affix my signature in the presence of two witnesses.

HERMAN L. HUMMEL.

Witnesses:
J. T. FRASER,
FRED B. VANATTA.